(12) United States Patent
Leichter et al.

(10) Patent No.: US 7,203,350 B2
(45) Date of Patent: Apr. 10, 2007

(54) DISPLAY FOR COMPUTER-AIDED DIAGNOSIS OF MAMMOGRAMS

(75) Inventors: Isaac Leichter, Jerusalem (IL); Philippe Bamberger, Jerusalem (IL); Boris Novak, Jerusalem (IL)

(73) Assignee: Siemens Computer Aided Diagnosis Ltd., Jerusalem (IL)

( * ) Notice: Subject to any disclaimer, the term of this patent is extended or adjusted under 35 U.S.C. 154(b) by 0 days.

(21) Appl. No.: 10/284,213

(22) Filed: Oct. 31, 2002

(65) Prior Publication Data

US 2004/0086158 A1  May 6, 2004

(51) Int. Cl.
   G06K 9/00   (2006.01)
   A61B 5/55   (2006.01)
   A61B 6/00   (2006.01)

(52) U.S. Cl. ............ 382/128; 382/131; 382/132; 382/133; 424/9.3; 424/9.4; 378/4; 378/21; 378/22; 378/23; 378/24; 378/25; 378/26; 378/27; 378/28; 378/29; 378/30; 378/31

(58) Field of Classification Search ............ 382/131, 382/128, 132, 133; 128/922; 424/9.4, 9.3; 378/4, 21–33, 901

See application file for complete search history.

(56) References Cited

U.S. PATENT DOCUMENTS

| | | | |
|---|---|---|---|
| 5,627,907 A * | 5/1997 | Gur et al. .............. | 382/132 |
| 5,729,620 A | 3/1998 | Wang | |
| 5,815,591 A | 9/1998 | Roehrig et al. | |
| 5,828,774 A | 10/1998 | Wang | |
| 5,832,103 A * | 11/1998 | Giger et al. ............ | 382/130 |
| 5,854,851 A | 12/1998 | Bamberger et al. | |
| 5,970,164 A | 10/1999 | Bamberger et al. | |
| 6,058,322 A * | 5/2000 | Nishikawa et al. ........ | 600/408 |
| 6,075,878 A * | 6/2000 | Yoshida et al. .......... | 382/132 |
| 6,075,879 A | 6/2000 | Roehrig et al. | |
| 6,198,838 B1 * | 3/2001 | Roehrig et al. .......... | 382/132 |
| 6,266,435 B1 | 7/2001 | Wang | |
| 6,282,305 B1 * | 8/2001 | Huo et al. .............. | 382/128 |

(Continued)

OTHER PUBLICATIONS

Baoyu Zheng et al., Digital Mammography : Mixed Feature Neural Network with Spectral Entropy Decision for Detection of Microcalcifications, I.E.E.E. Transactions on Medical Imaging, vol. 15, pp. 589-597, Oct. 1996.*

(Continued)

*Primary Examiner*—Jingge Wu
*Assistant Examiner*—Brian Le
(74) *Attorney, Agent, or Firm*—Nixon & Vanderhye, PC

(57) ABSTRACT

A method for displaying a computer-generated determination of the likelihood of malignancy in a mammogram lesion. The method requires providing a digitized image of a mammogram, displaying the digitized image, and selecting a region of interest directly on the displayed digitized image. The digitized image is then processed so that classifier data of the lesion in the user-selected region of interest are generated and displayed. A system for displaying a determination of the likelihood of malignancy in a mammogram lesion. The system includes a display for presenting a digitized mammogram and an input device in communication with the display for selectably indicating a region of interest on the displayed mammogram. The system also includes a processor for generating classifier data related to a characterization feature within the region of interest. The classifier data is presented on the display.

31 Claims, 7 Drawing Sheets

U.S. PATENT DOCUMENTS 6,285,992 B1 * 9/2001 Kwasny et al. ............... 706/20
6,434,262 B2 8/2002 Wang
6,470,092 B1 * 10/2002 Li et al. ..................... 382/132
6,650,766 B1 * 11/2003 Rogers et al. ............. 382/132

OTHER PUBLICATIONS

M. Naf Gurcan et al., Automated Detection and Enhancement of Microcalcifications in Mammograms using Nonlinear Subband Decomposition, I.E.E.E. Acoustics, Speech and Signal Processing, vol. 4, pp. 3069-3072, Apr. 1997.*

Jong Kook Kim et al., Statistical Textural Features for Detection of Microcalcifications in Digitized Mammograms, I.E.E.E. Transactions on Medical Imaging, vol. 18, pp. 231-238, Mar. 1999.*

A.S. Constantinidis et al., Evaluating classification strategies for detection of circumscribed masses in digital mammograms, I.E.E.E. Image Processing and Its Applications, vol. 1, pp. 435-439, Jul. 1999.*

Songyang Yu et al., A CAD System for the Automatic Detection of Clustered Microcalcifications in Digitized Mammogram Films, I.E.E.E. Medical Imaging, vol. 19, pp. 115-126, Feb. 2000.*

Walker H. Land et al., New Results in Breast Cancer Classification Obtained from an Evolutionary Computation/Adaptive Boosting Hybrid Using Mammogram and History Data, I.E.E.E. Soft computing in Industrial Applications, pp. 47-52, Jun. 2001.*

Estevez L.W et al., Computer Assisted Enhancement of mammograms for Detection of microcalcifications. I.E.E.E. Computer-Based Medical Systems, pp. 16-23, Jun. 1995.*

* cited by examiner

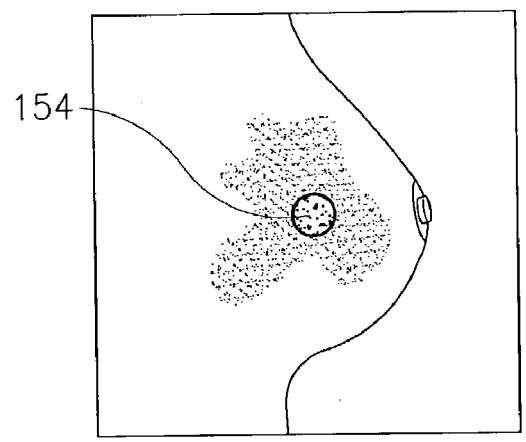
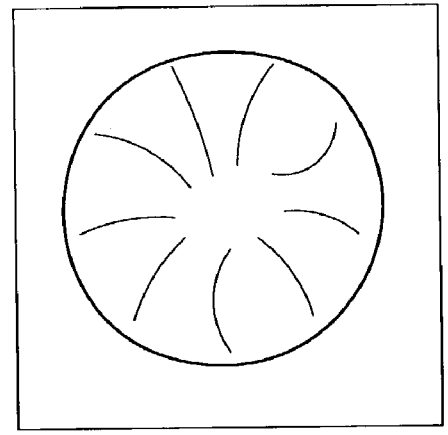
FIG.2A                FIG.2B
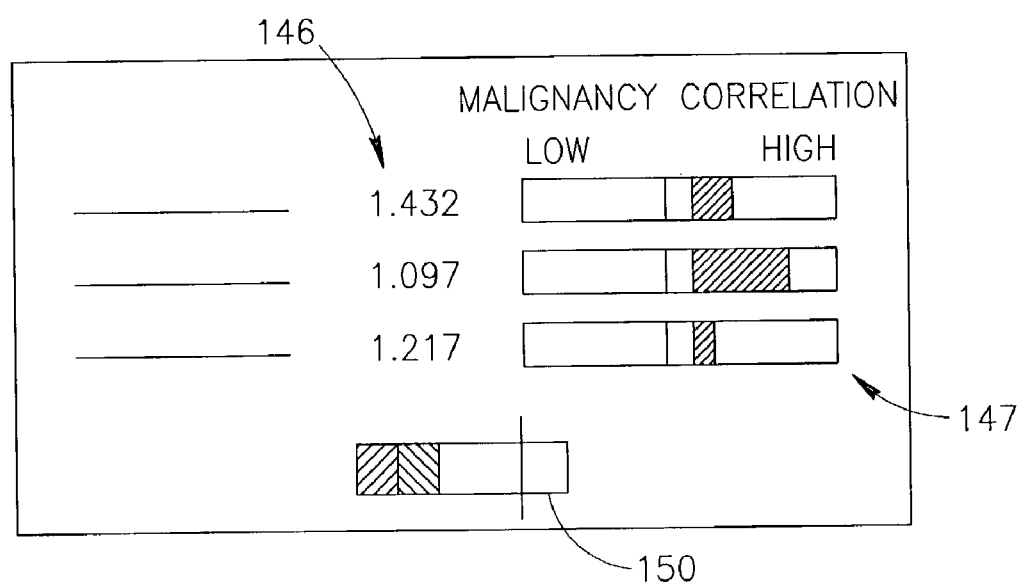
FIG.2C

DISPLAY FOR COMPUTER-AIDED DIAGNOSIS OF MAMMOGRAMS

FIELD OF THE INVENTION

The present invention relates to a method and system for displaying evaluation/classification information that assists in determining the malignancy or non-malignancy of abnormalities appearing on radiological mammogram images.

BACKGROUND OF THE INVENTION

Breast cancer is one of the most common types of cancer afflicting Western society. It is estimated that the spread of the disease has risen in the United States, from one in twenty women being afflicted in 1940, to one in eight in 1995. The American Cancer Society estimated that 183,000 new cases of breast cancer were reported during 1995. In the United States, some 46,000 women die from the disease per year. Today, it is accepted that the best way to detect breast cancer in its early stages is by annual mammography screening of women aged 40 and up.

The five-year survival rate for localized breast cancer is 93%. That rate drops to 72% if the cancer has spread regionally by the time of diagnosis. For patients with distant metastases at the time of diagnosis, the five-year survival rate is only 18%. Early diagnosis is thus of great importance to the cure. Since the interpretation of mammographic lesions is problematic, a need for advanced diagnostic tools is required.

The main mammographic findings that may indicate breast cancer are:
1. masses and densities
2. micro-calcifications The characteristics used to determine whether or not masses are malignant are: a) shape (regularity versus irregularity), b) margins (distinct or non-distinct), c) spiculation (thin lines extending from the mass).

The characteristics distinguishing between malignant or benign micro-calcifications are: size, form, pleomorphism within the cluster, cluster shape (if linear or branch-like), spatial density (if crowded or spread out) and relationship to masses.

Today, radiologists generally interpret the mammogram visually, using a light box, and their analysis is largely subjective. Film masking is used to highlight additional detail. In many cases, the radiologist employs supplementary tools such as a magnifying glass and bright light sources to evaluate very dark regions. If the mammogram is not conclusive the radiologist must recall the patient for an additional mammogram using one or more of the following techniques:
1. adding a view with a different projection.
2. performing a magnification mammogram by changing the distance between the breast and the film.
3. locally compressing the breast in the area of suspected abnormality.

The analysis, even after using the above techniques, still remains mainly subjective.

All the statistical data related to the conventional mammogram process were published in scientific literature and concern the U.S. population only. It is assumed that these data are also relevant outside the U.S.
1. Most professional organizations recommend that women over age 40 have a mammography examination once a year.
2. There is a recall rate of about 20%. This is the percentage of patients recalled to perform further examinations, essentially another mammogram.
3. About 3% of women who are evaluated by screening mammography are referred for a biopsy.
4. In screening mammography, about 60 malignancies are found in a sample of 10,000 cases.
5. The false negative rate of the mammographic screening process is difficult to estimate. It is generally accepted that 15% of the women who have ultimately been diagnosed with breast cancer and who had a mammogram performed during the previous 12 months were not originally diagnosed with cancer.
6. The false positive rate of the screening mammography process, i.e. the rate of negative results of biopsies performed due to the screening process, is about 80%.

In order to aid radiologists in reducing the false negative rate in mammographic screening, computer systems using specialized software and/or specialized hardware have been developed. These systems, often called computer-aided detection systems, have been known for many years and have been reported extensively. As noted below, their use in evaluating mammograms has been discussed at length in both the patent and professional literature.

Reading large numbers of mammograms is a difficult and tiring task. According to some literature reports as noted above, unacceptably high rates of false negative results occur. Using computer-aided detection systems provides an independent detection mechanism assisting radiologists in attaining higher malignancy detection rates, i.e. reducing false negative rates.

However, it is well known that computer-aided detection systems almost invariably indicate more suspected abnormalities than are detected by a trained radiologist. The number indicated is often significantly greater than can easily be reviewed. Therefore, a radiologist may have to examine, and must often dismiss, not only the suspected abnormalities that he detects from the radiological mammogram films but also the additional, typically greater number of, suspected abnormalities detected by the computer-aided detection system. Depending on how many more additional suspected abnormalities the computer-aided detection system detects and identifies on the display, the extra work in examining and dismissing these additional abnormalities can slow down the diagnostic process. Even with the use of confidence levels, which usually are insufficiently detailed and nuanced, the task of reviewing the many false locator markers displayed by the system may be more tiresome and troublesome than the benefits that accrue from looking more carefully into the individual suspected lesions.

Computer-aided detection and computer-aided diagnosis mammography systems have been discussed extensively in many issued patents. An overview of the field can be obtained by reviewing U.S. Pat. Nos. 5,729,620 (Wang); U.S. Pat. No. 5,815,591 (Roehrig et al); U.S. Pat. No. 5,828,774 (Wang); U.S. Pat. No. 5,854,851 (Bamberger et al); U.S. Pat. No. 5,970,164 (Bamberger et al); U.S. Pat. No. 6,075,879 (Roehrig et al); U.S. Pat. No. 6,198,838 (Roehrig et al); U.S. Pat. No. 6,266,435 (Wang); and U.S. Pat. No. 6,434,262 (Wang). These patents, including references cited therein, are hereby incorporated by reference in this specification as though fully set forth herein.

Definitions

In what is discussed herein, including the claims, the following terms will be used generally with the following meanings:

Lesion—used interchangeably with suspected or suspicious abnormality without any attempt at distinguishing between them. A lesion or abnormality in a mammogram is generally characterized by a characterization feature as defined below.

Characterization features—anatomical features that typically accompany malignancies and are normally used in assessing if an abnormality in a mammogram is malignant. Typical characterization features of lesions that are often evaluated to determine malignancy include spiculations, micro-calcifications, mass density and/or mass borders. These characterization features are exemplary only and are not to be considered limiting.

Parameters—algorithmically defined properties related to characterization features. These properties, when quantified, are used to determine if a characterized feature of a lesion is likely to indicate that the lesion is malignant or benign. Typical parameters, which can be used to evaluate characterization features of a lesion, are:

for spiculations—degree of spiculation, symmetry of spiculation and directionality of spiculation.

for a micro-calcification cluster—average shape, variability of brightness, variability of area, variability of length, average proximity, number of neighbors and cluster density.

These parameters are exemplary only and are not to be considered limiting. Parameter definition and calculation are algorithm dependent.

Classifier data—quantified parameters as defined above and/or an overall evaluation of malignancy based on a quantified, weighted and summed set of parameters. The classifier data provides an indication of the likelihood of malignancy of a suspected lesion. The overall bar charts described herein below (see inter alia FIG. 3A below) is a typical, but non-limiting, method of presenting an overall evaluation of malignancy.

Overall evaluation of malignancy—a weighted sum of parameters indicating the likelihood of malignancy. Used interchangeably with terms such as "overall evaluation of the likelihood of malignancy", "overall determination of malignancy" and the like without any attempt at distinguishing between them.

SUMMARY OF THE PRESENT INVENTION

It is an object of the present invention to provide a system and method for displaying data which assist a radiologist in diagnosing suspected lesions in mammograms, particularly hard to see or difficult to evaluate lesions.

It is a further object of the present invention to provide a method and a system in which classifier data presented with a mammogram assists in reducing the rate of false negative and false positive diagnoses.

An additional object of the present invention is to provide a nuanced evaluation of malignancy for use by a radiologist in diagnosis. The evaluation of malignancy is effected using a plurality of parameters rather than a single value indicating a binary yes-no evaluation.

Another object of the present invention is to present classifier data relating to a mammogram abnormality that permits easy evaluation of changes in the abnormality over a period of time.

There is thus provided in accordance with the present invention a method for displaying a computer-generated determination of the likelihood of malignancy of a lesion observed in a mammogram. The method includes the steps of providing a digitized image of the mammogram and displaying the digitized image. It also requires employing an input device to select a region of interest directly on the displayed digitized image. The location of the selected region of interest is communicated to a computer processor. The digitized image is processed using the computer processor so that classifier data of a characterization feature of the lesion in the user-selected region of interest are quantified. The classifier data is comprised of a plurality of parameters and/or a weighted sum of these parameters, the latter representing a computer-generated overall evaluation of the likelihood of malignancy. Finally, the method requires displaying the quantified classifier data relating to the characterization feature in the selected region of interest. The displayed classifier data generally includes a computer-generated overall evaluation of the likelihood of malignancy of the lesion.

Additionally, in accordance with a preferred embodiment of the present invention, the characterization feature is a user-selected characterization feature. Typically, the classifier data are displayed on a part of the display separate from the digitized image. The displayed classifier data can be displayed in one of the following formats: as a sum of weighted parameters, the sum indicating an overall evaluation of malignancy and typically displayed in a multicolor chart format; as a plurality of parameters, either as numerical values or in a multicolor chart format or as both; and both as a sum of weighted parameters, the sum indicating an overall evaluation of malignancy and typically displayed in a multicolor chart format, and as a plurality of parameters. The multicolor charts generally have a non-linear relationship with the quantities they represent.

In an embodiment of the invention, one or more parameters in the classifier data are displayed in the displaying step as a numerical value. The numerical value of the one or more parameters is tracked over time, that is over a series of mammograms taken, for example, over a period of months. The one or more parameters are displayed according to the above described method in each mammogram, and the time series of numerical values assists in determining a malignant abnormality.

In yet another embodiment of the present invention, there is provided a method that requires providing a digitized image of the mammogram and displaying the digitized image. It also requires processing the digitized image using a computer processor so that all classifier data of all characterization features in the digitized image are quantified and stored for later retrieval. The classifier data of each of the features is comprised of a plurality of parameters. An input device is employed to select a region of interest directly on the displayed digitized image. The location of the selected region of interest is communicated to the computer processor. The quantified classifier data related to a characterization feature in the selected region of interest is retrieved from storage. Finally, the quantified classifier data of the characterization featured in the selected region of interest is displayed. The displayed classifier data generally includes a computer-generated overall evaluation of the likelihood of malignancy that assists a user in determining the likelihood of malignancy of a lesion on the mammogram.

There is provided in accordance with another aspect of the present invention a system for displaying a computer-generated determination of the likelihood of malignancy of a lesion in a mammogram. The system includes a mammogram provider for providing a mammogram, an optional digitizer for digitally representing the provided mammogram if the original mammogram is in an analog format, and a display for displaying the digitized mammogram. It further includes an input device in communication with the display for selectably indicating a region of interest on the displayed digitized mammogram. Additionally, it includes a processor in communication with the display. The processor processes, that is computes and classifies, classifier data related to a characterization feature of a lesion in the digitized mammogram. The digitized mammogram and the selected region of interest are displayed on the display. The display also presents the quantified classifier data related to the characterization feature located in the user-selected region of interest. The displayed classifier data typically includes a computer-generated overall determination of the likelihood of malignancy of the lesion.

In another embodiment of the system, a storage unit is included. The storage unit is in communication with the display and the processor. The classifier data of all characterization features on the mammogram is first processed, that is computed and classified, by a processor and then stored in the storage unit. The classifier data relating to the characterization feature in the selected region of interest is later retrieved from the storage unit and transferred to the display for displaying. It is readily understood that the storage unit could be a part of the processor itself.

BRIEF DESCRIPTION OF THE DRAWINGS

The present invention will be understood and appreciated more fully from the following detailed description taken in conjunction with the drawings in which:

FIGS. 2A–2F are schematic illustrations of digitized images and classification data relating to the digitized images displayed in accordance with an embodiment of the present invention;

Similar elements in the Figures are numbered with similar reference numerals.

DETAILED DESCRIPTION OF PREFERRED EMBODIMENTS

Figure 1A:
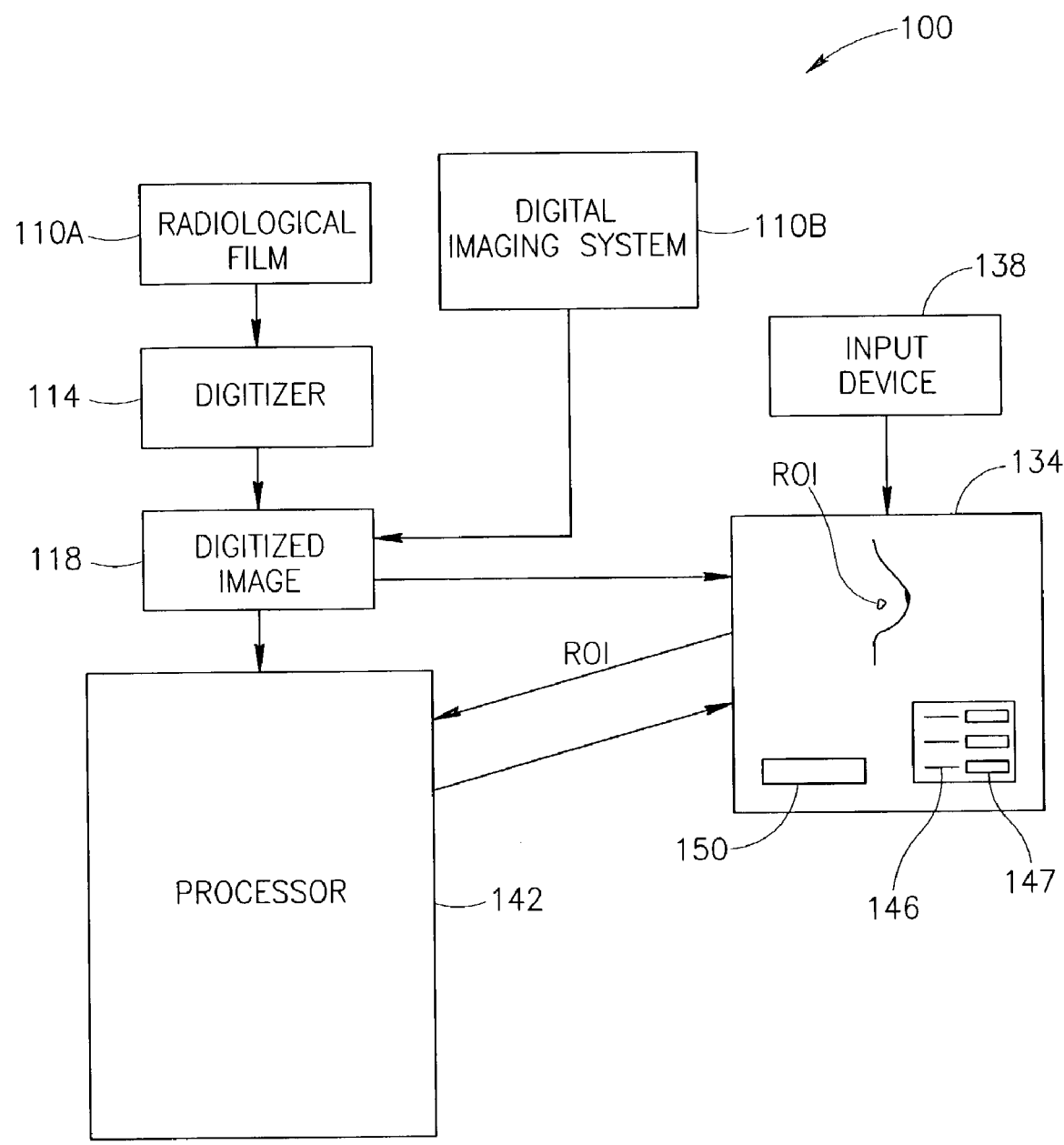
FIGS. 1A and 1B are block diagrams of two embodiments of systems constructed in accordance with the present invention.

The present invention relates to a method and system for displaying digitized mammogram images and diagnosis-assisting information that aids in interpreting the images. More specifically, the invention relates to a computer-aided diagnosis (herein after sometimes denoted as "CAD") method and system for classifying and displaying malignancy evaluation/classification data for anatomical abnormalities in digitized mammogram images. Characterization features of suspected abnormalities in user-selected regions of interest (ROI) are viewed on a display in conjunction with an overall evaluation of malignancy and usually also with a plurality of quantified parameters related to the characterization features. The overall evaluation of malignancy and/or the plurality of quantified parameters are herein also called classifier data. The characterization features viewed and evaluated/classified are also user-selected.

The overall evaluation of a suspected lesion in the radiological images is presented typically, but not necessarily, as a bar chart. The bar chart represents the sum of weighted values of a plurality of predetermined parameters relating to a characterization feature of a suspected lesion located within the user-selected ROI.

The present invention is not intended to detect mammographic abnormalities. The invention is intended to: A. statistically evaluate and classify the malignant or benign character of lesions found within a user-selected ROI, and B. display the quantitative results of that evaluation. In particular, the display of classifier data is intended to assist the radiologist in diagnosing lesions which are hard to see and/or difficult to evaluate visually.

The method and system of the present invention has several advantages:

1. Prior art displays generally do not provide sufficient information to adequately assist the radiologist with his diagnosis. In the present invention, because numerical values for a plurality of parameters characterizing a suspected anatomical abnormality is presented as well as bar charts for each parameter, the diagnostician has more complete and nuanced information with which to make an informed diagnosis. It should be noted that some of the calculated numerical values can not be intuitively or otherwise easily estimated by a radiologist without the use of a computerized system.

2. In prior art systems, the radiologist is directed to analyze computer determined marked locations on a mammogram. In the present invention, the radiologist determines ROIs that he believes may contain anatomical abnormalities and for which he wishes computer assistance. The radiologist may therefore choose an ROI and analyze the classifier data related to a suspicious lesion within the ROI that would not necessarily be marked by the computer. As a result, the number of missed cancers would be reduced.

3. Prior art systems generally display an overabundance of marked abnormalities without sufficient information to adequately assist the radiologist with his analysis. Because the present invention provides numerical values for a plurality of parameters characterizing a detected anatomical abnormality as well as bar charts for each parameter, the number of false positives is reduced.

4. By looking at the numerical value of a parameter, for example cluster density when viewing micro-calcifications, and comparing it to the numerical value of that parameter in one or more previous mammograms, a non-visual determination can be made for possible malignant changes in the lesion over time. This provides the radiologist with an additional diagnostic tool.

Reference is now made to FIG. 1A, which illustrates a system according to an embodiment of the present invention that displays a characterization feature of a suspected lesion on a digitized mammogram image. The feature's associated classifier data, that is quantified classification/diagnostic parameters and/or a quantified overall evaluation/classification of the likelihood of malignancy of the lesion, are also displayed. The system, generally referenced 100, requires a mammogram provider (110A or 110B) to provide a mammogram. The mammogram provider can be a radiological film system 110A which provides a mammogram in analog format. A digitizer 114 then converts the mammogram into a digitized mammogram image 118. Alternatively, the mammogram provider can be a digital imaging system 110B, discussed further below, which provides a digitized image 118 directly. No digitization by digitizer 114 is required when a digitized imaging system 110B is used. Typically, but without being limiting, the film digitizer 114 is a high resolution charged coupled device (CCD) or laser film digitizer. Digitized image 118 is transferred to a display 134 and to a processor 142. It should readily be understood by one skilled in the art that digitized image 118 could also be transferred to display 134 from processor 142 after image 118 is first sent to processor 142.

A digital imaging system 110B used as mammogram provider may be based on any one of many technologies currently available. These, for example, include, but are not limited to, systems based on magnetic resonance imaging (MRI), computed tomography (CT), scintillation cameras and flat panel digital radiography. All these systems provide radiological mammogram images directly in digital format. If required, the digital mammogram can be reformatted into a digitized mammographic image compatible with processor 142 prior to its being transferred to processor 142. Processor 142 can employ any of the many algorithms described in the literature to compute and classify parameters associated with the characterization features of breast lesions. The output of processor 142 is usually a quantified value for each of several predetermined parameters associated with the characterization features of the suspected abnormalities, and an overall evaluation of malignancy for the characterization features based on those values. There typically is an evaluation of malignancy correlation for each of the individual parameters as well. Algorithms for use in computing and classifying a plurality of parameters associated with different characterization features of breast abnormalities have been described in the patent and technological literature, some of which have been cited above. Typical algorithms which can be used to determine spiculations, micro-calcifications and/or mass borders are described in U.S. Pat. Nos. 5,854,851 and 5,970,164, both to Bamberger et al, herein incorporated by reference in their entirety.

A user operated input device referenced 138, such as a computer mouse or touch screen, is in communication with display 134. The user employing the input device indicates directly on the digitized image appearing on display 134 an area of the breast—a region of interest (ROI)—for which he requests assistance in diagnosis. With the aid of the input device, a suspect area of the breast is typically circumscribed by a closed curve. Without being limiting, the curve can be circular, polygonal or elliptical, typically the latter. Information is transferred from display 134 to processor 142 as to the location of the ROI selected on the digitized image. Processor 142 then processes, that is quantifies and classifies, the predefined parameters related to a characterization feature in the user-selected ROI and determines an overall evaluation of malignancy, for the feature. Processor 142 then transfers the overall evaluation of malignancy for the suspected abnormality and/or the individual quantified parameters related to the suspected abnormality to display 134 where they are displayed and can be viewed by the user.

Only areas believed to contain suspected abnormalities and chosen by the user as an ROI have their overall evaluation 150 and quantified parameter information 146 and 147 displayed. Processor 142 does not choose the suspected region; the user alone determines the ROI. This reduces the number of suspected lesions that need to be reviewed, since the number of computer determined lesions generally tends to be far greater than the number of suspicious lesions determined by a radiologist. A bar chart 150 indicating an overall evaluation of malignancy, and/or ancillary numerical values 146, and/or bar chart data 147 for the individual parameters used to arrive at the overall classification are displayed on display 134. The classifier data displayed relates to the characterization feature in the ROI selected. It is readily understood that as the radiologist selects and moves from one ROI to another, a different set of classifier data is displayed.

Display 134 of FIG. 1A shows a complete breast with a selected ROI thereon. Display 134 could also, and usually does, provide an expanded view of the ROI and the characterization feature located within the ROI which is being analyzed. Such an expanded view is shown in FIGS. 2B and 2E discussed herein below.

Without being limiting, the classification data shown on the display is typically presented as a multi-color bar chart 150 or as a multi-color bar chart 150 plus ancillary parameter information 146 and 147. The bar chart 150 is typically composed of three colored regions, one colored region representing a likely benign lesion, one colored region representing a likely malignant lesion, and a colored region between the malignant and benign regions indicating a lesion of indeterminate nature. The malignant region is generally an expanded non-linear region intended to give the user a better, more complete, more nuanced indication of the likelihood of malignancy. An indicator line is positioned along bar chart 150 at the position determined by the computer.

Bar chart 150 represents the overall evaluation of malignancy of the suspected abnormality. Chart 150 represents the sum of weighted values of a plurality of parameters. These parameters are chosen because they are statistically known to correlate with the malignancy of breast lesions. Each parameter is calibrated using a database of radiologist reviewed mammograms. Each characterization feature of a breast lesion, such as spiculation, micro-calcifications and mass density, is based on a different set of predetermined parameters.

The ancillary information, that is information relating to the plurality of independent parameters that are weighted to generate the overall evaluation of malignancy indicated by multicolor bar chart 150, may itself be presented in numerical value 146 and/or bar chart 147 form. As noted above, the presentation of such additional information provides the radiologist with significantly more information than prior art presentations, thereby allowing him to arrive at a more accurate diagnosis.

While what is described herein is described in terms of bar charts, it should be readily evident to one skilled in the art that other equivalent graphical or visual presentations can be used, such as histograms, pie charts, etc. Similarly it is readily evident that what is described herein is only one of many possible bar chart displays.

It was noted above that the user first selects an ROI using input device 138 and then processor 142 processes and computes the classifier data for that portion of the digitized image within the selected ROI. Processor 142 first processes, computes and classifies the classifier data for the selected ROI, transmitting them to display 134. In an alternative embodiment, shown in FIG. 1B to which reference is now made, a system is shown generally referenced 160, in which the parameters associated with all the characterization features for the entire digitized image are processed, computed and classified. This information may then be stored in a storage unit 130 which is separate from, but in communication with, processor 142. It is readily understood by one skilled in the art that, alternatively, storage unit 130 can be constructed to be an integral part of processor 142. After an ROI is selected, the evaluation/classification and parameter information related to the ROI is retrieved from storage unit 130 and sent for display to display 134.

Figure 1B:
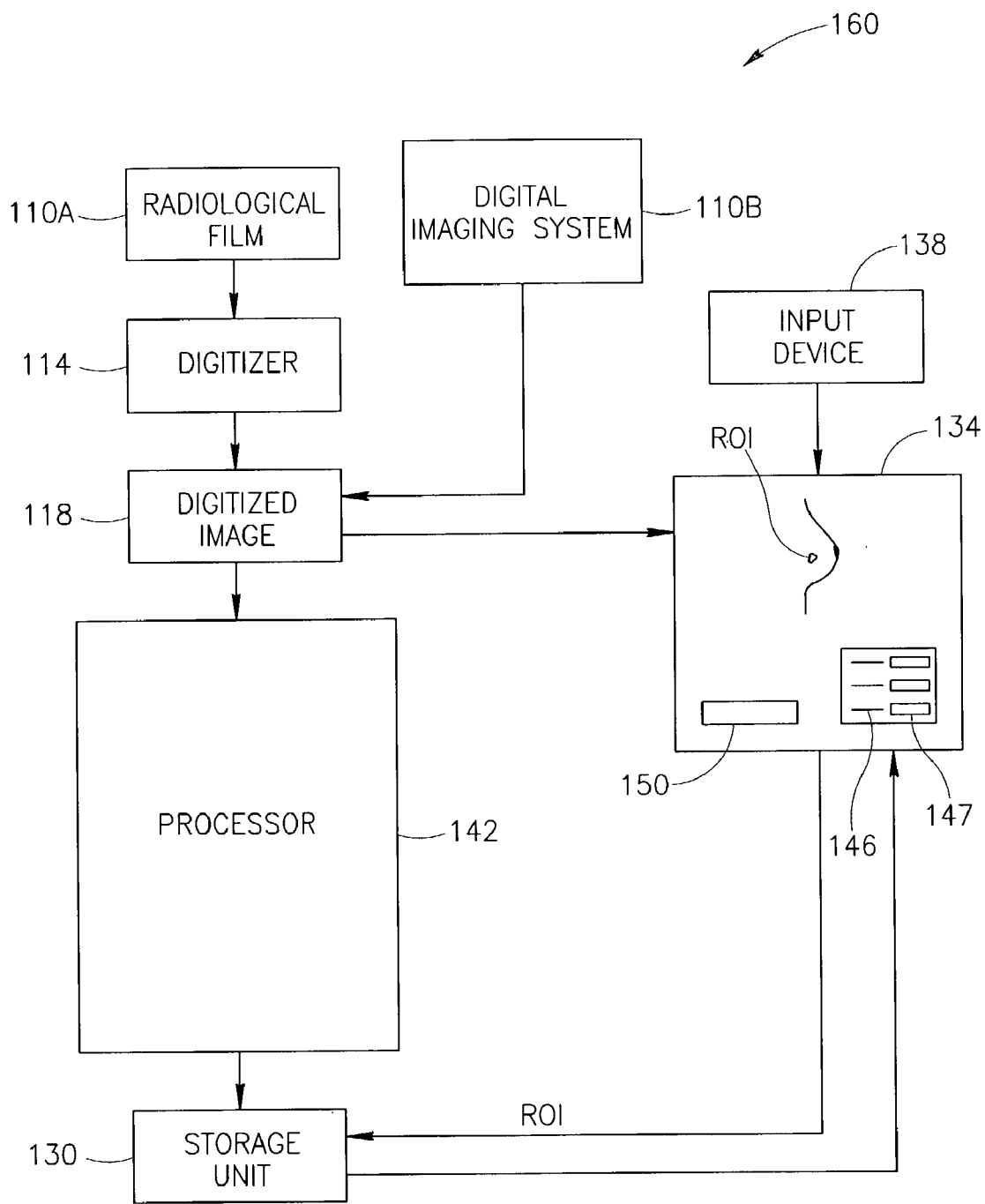

Another embodiment of a system constructed according to the present invention can be considered a hybrid of the embodiments described in conjunction with FIGS. 1A and 1B. Storage unit 130 is in communication with processor 142. When display 134 transfers information about the choice of a user-selected ROI to processor 142, the relevant classifier data is retrieved from storage unit 130 and returned to processor 142 upon a command from the latter. Finally, the retrieved classifier data can be transferred from processor 142 to display 134 for viewing.

Figure 2D:
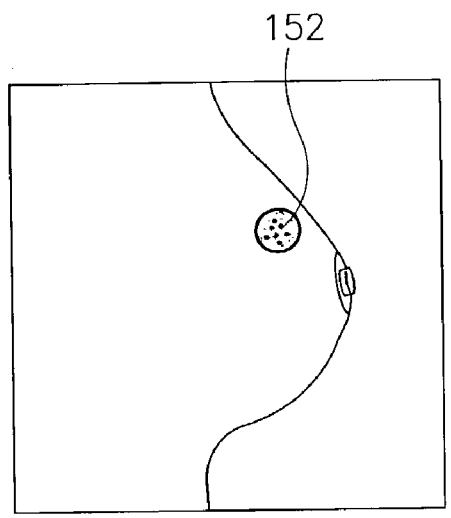
Figure 2E:
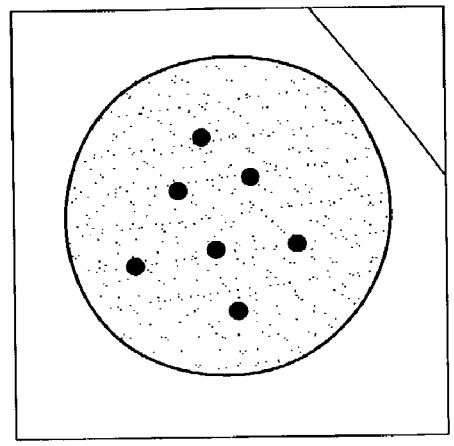

FIGS. 2A–2C and FIGS. 2D–2F, to which reference is now made, illustrate typical displays according to the present invention of two characterization features of breast lesions that may be used to evaluate the malignancy of breast lesions. FIGS. 2A–2C show the display of a digitized mammogram containing spicule lines circumscribed by an ellipse indicating an ROI 154 (FIG. 2A), spicule lines in the selected ROI 154 as displayed by the spiculation visualization tool of the system (FIG. 2B), and a typical display of classifier data relating to the spiculations (FIG. 2C). It should be noted that the spicule visualization tool is not a separate visualization tool but rather a display of the morphological analysis performed for quantification purposes of the image inside ROI 154. The classifier data (FIG. 2C) displayed includes numerical values 146 and bar charts 147 of several different parameters associated with spicule lines, as well as a bar chart 150 indicating the overall evaluation of malignancy of the spiculated lesion. The classifier data is generally displayed below or outside the margins of the displayed spicule lines so as not to interfere with their presentation.

Figure 2F:
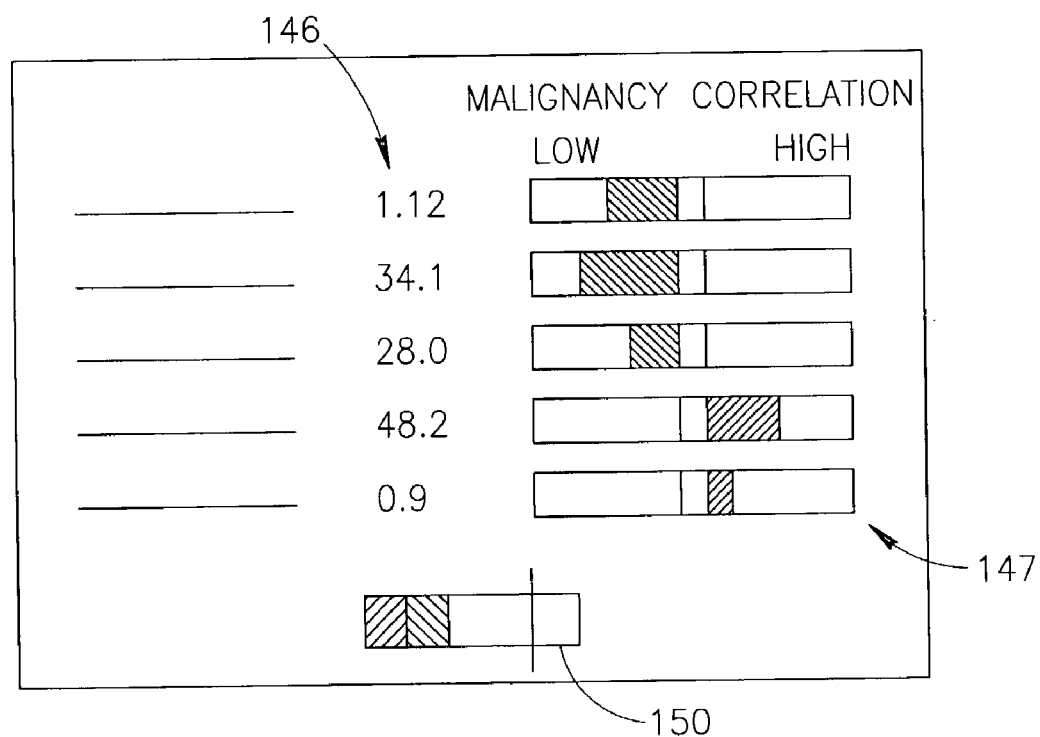

FIGS. 2D–2F illustrate a digitized mammogram (FIG. 2D) containing a cluster of micro-calcifications circumscribed by an ellipse indicating an ROI 152, an enlarged display (FIG. 2E) of ROI 152 containing the cluster, and a display (FIG. 2F) of typical classifier data relating to the displayed micro-calcification cluster. The classifier data of the micro-calcification cluster as displayed in FIG. 2F includes a multi-color bar chart 150 indicating the overall likelihood of malignancy, and numerical values 146 and bar charts 147 for many of the individual parameters used to compute the overall evaluation of the malignancy.

The overall evaluation of malignancy in FIGS. 2C and 2F (shown here as bar charts) is determined by summing the weighted value of a plurality of predetermined parameters, where the parameters are calculated according to the specific algorithm used by processor 142 of FIGS. 1A and 1B. Each parameter has been determined previously to correlate statistically with the malignancy of a lesion. The individual parameters are weighted in the overall score according to their pre-established degree of correlation with malignancy.

In FIGS. 2C and 2F, the individual parameters themselves are shown both as numerical values 146 and as bar charts 147. Each individual bar chart 147 indicates the likelihood of malignancy based on that parameter alone. The extra information provided by this form of display is valuable for the diagnostician in determining the malignancy or non-malignancy of a lesion. An overall evaluation as presented in bar chart 150 supplemented with additional parameter-by-parameter information as provided by numerical values 146 and bar charts 147 allows for more accurate diagnoses than when a single overall value alone is displayed.

As noted above, numerical values also allow for easier tracking of changes in a lesion over time leading to a more accurate diagnosis. Typically, several mammograms would be taken over a time period of several months. The numerical value of a given parameter for a characterization feature of a suspected lesion would be compared for changes over that period when evaluating the malignancy or non-malignancy of the lesion.

Figure 3A:
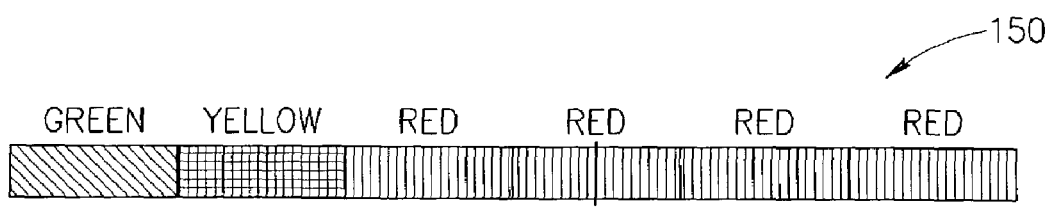
FIGS. 3A–3E are schematic illustrations of bar charts used to represent the overall evaluation of malignancy of a lesion and the individual parameters used to arrive at the overall evaluation of malignancy in accordance with an embodiment of the present invention.

Reference is now made to FIGS. 3A–3E where the overall evaluation of malignancy bar chart 150 and the individual parameter bar charts 147 discussed above in conjunction with FIGS. 2C and 2F are presented according to an embodiment of the present invention. Bar chart 150 shown in FIG. 3A represents an overall evaluation of malignancy display and is comprised of six colored cells: one green, one yellow, and four red. There is an indicator bar that is positioned along the graph according to the results of the algorithm that indicates the likelihood of malignancy.

As mentioned above, the parameters calculated by the algorithms are weighted and then summed to provide an overall value for the likelihood of malignancy. This weighted sum is reflected in the position of the indicator on bar chart 150. The exact parameters chosen with which to calculate the likelihood of malignancy are a function of the algorithm used while the weighting factors are determined statistically to reflect the likelihood of malignancy. The parameters and weighting factors are different for each characterization feature. The overall evaluation is calculated by using the original values of the chosen parameters and weighting them based on their known statistical correlation with breast malignancies. These weighted scores are then summed.

As a typical non-limiting example, the overall evaluation bar chart 150 shown in FIG. 3A is presented as a bar chart having six colored cells; the leftmost cell being colored green, the second cell from the left being colored yellow and the four rightmost cells being colored red. The overall evaluation/classification relating to the weighted total score is indicated as a black line in one of the cells. The further to the right in the four rightmost cells the greater the likelihood of malignancy. The overall evaluation of malignancy bar chart is non-linear and based on a distribution function of the classifier data for benign and malignant cases. The distribution function is a histogram showing frequency of malignant cases for each value of classifier data. This form of presentation of the overall likelihood of malignancy is more effective than prior art presentations because it provides the radiologist with a more meaningful picture of the malignancy score.

Figure 3B:
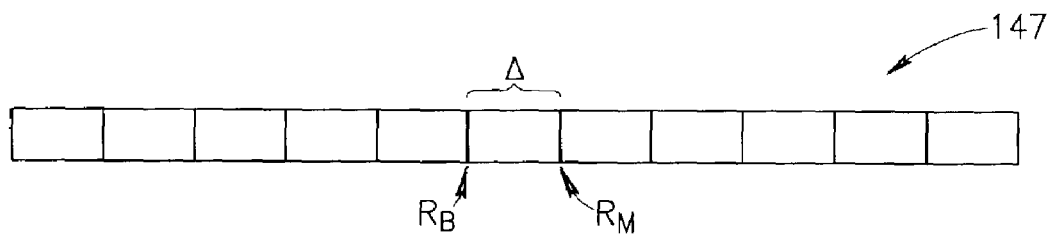

As shown in FIG. 3B, for each parameter, an 11 cell horizontal bar chart 147 is generated on which two reference value lines are displayed, a benign reference value, here designated as Rb, and a malignant reference value, here designated as Rm. The difference between the benign reference value, Rb, and malignant reference value Rm, is designated as delta. The five cells on the left of the benign reference value Rb, refer to benign values while the five cells to the right of the malignant reference value Rm, refer to malignant values. The middle cell represents an indeterminate value. Each cell, except the rightmost and leftmost cells, represents an interval of values equal to delta. The leftmost cell begins at the benign reference value Rb, less 4*delta and extends to infinity. The rightmost cell represents values beginning at the malignant reference value Rm, plus 4*delta and extends to infinity.

Figure 3C:
Figure 3D:
Figure 3E:
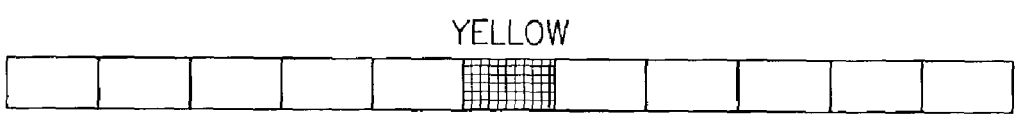

If the actual value is below the lower reference value, the benign reference value Rb, the cells located between the line representing the benign reference value Rb and the cell corresponding to the actual value are colored green as shown in FIG. 3C. FIG. 3C shows a presentation of results for an "extremely" benign lesion. Similarly, if the actual value is above the upper reference value, the malignant reference value Rm, the cells located between the line representing the malignant reference value Rm, and the cell corresponding to the actual value are colored red as shown in FIG. 3D. FIG. 3D shows a presentation of results for a "moderately" malignant lesion. When the malignancy for a parameter is found to be indeterminate, that is below the malignant reference value and above the benign reference value, the central cell is colored yellow as shown in FIG. 3E.

It is readily understood by one skilled in the art that other methods of graphical presentation can also be used instead of the bar charts in FIGS. 3A and 3B. Similarly, the colors indicated in FIGS. 3A–3E and used in the discussion herein, are exemplary only. The above presentation is a typical, but non-limiting, example. For example, in one variation of the presentation, and for exemplary purposes only, the shade of red can increase in going from a less likely overall evaluation of malignancy to a more likely evaluation of malignancy. Most important is that the presentation indicates small differences in the quantified classifier data, especially the overall evaluation bar chart, and that these differences can be easily noted by the radiologist.

In another embodiment of the present invention, the characterization feature of the lesion being evaluated, for example spicule lines or micro-calcifications, can be presented on the display using a color indicating its malignancy. The characterization feature would have the same color as the color indicated on the overall evaluation of malignancy presentation, typically a bar chart presentation similar to the one discussed in conjunction with FIG. 3A.

Figure 4A:
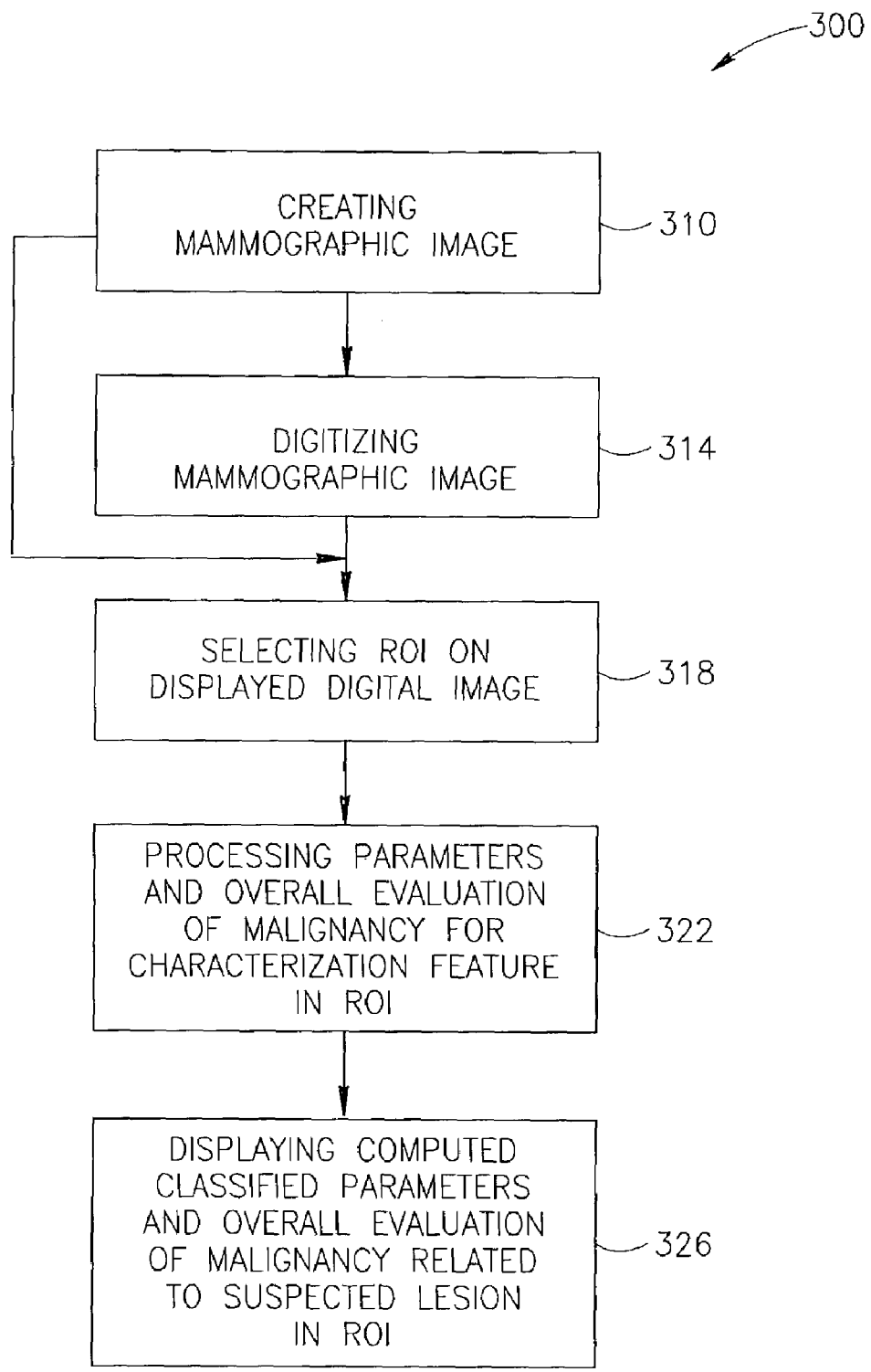
FIGS. 4A and 4B are flow charts of two embodiments of the method of the present invention.
Figure 4B:
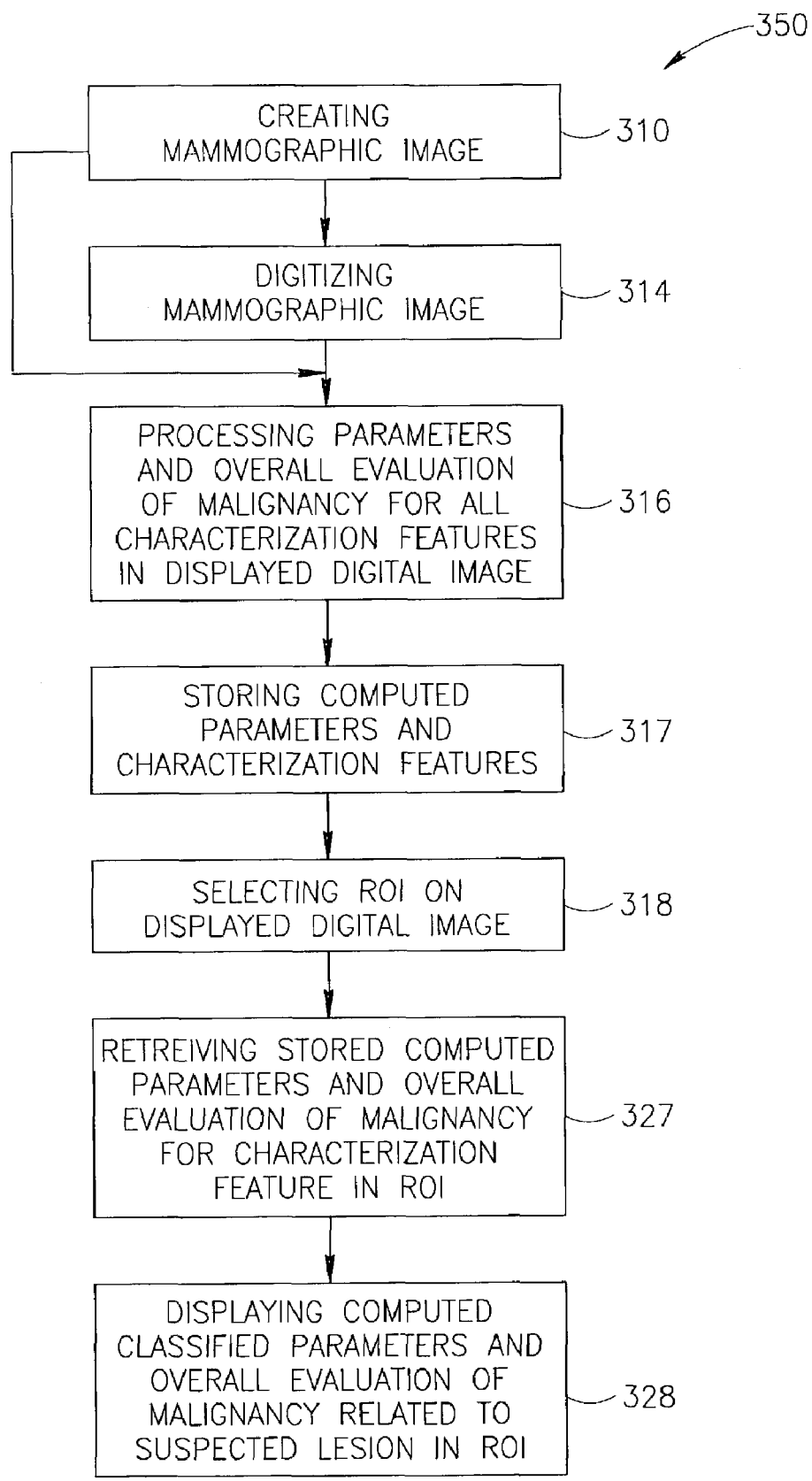

Reference is now made to FIGS. 4A and 4B where two embodiments of the method of the present invention are illustrated. In FIG. 4A, where the method is generally referenced 300, a radiological image is created 310 either by using a digital imaging system or by using a mammogram film system as described above in conjunction with FIG. 1A. The mammographic image is then digitized 314 and displayed. If the mammographic image is already a digitized image, that is if the image has been generated by a digital imaging system as described in conjunction with FIG. 1A above, step 314 does not need to be performed and the image is displayed directly.

The user selects 318 a region of interest (ROI) on the displayed digitized mammographic image for which he requires assistance in diagnosis. Selection is typically, but not necessarily, indicated by circumscribing the ROI on the display with a closed curve. Note that the user diagnostician chooses the ROI and not the CAD system. Accordingly, the number of suspected abnormalities displayed using the CAD is held to a number commensurate with the needs of the user and his ability to comfortably review them.

Processing 322 then ensues. Processing includes identifying the user-selected characterization feature in the user-selected ROI chosen in step 318. It also includes computing all predetermined parameters associated with the characterization feature, classifying the individual parameters as to their likelihood of malignancy, and computing an overall evaluation of malignancy based on the sum of the parameters after weighting them.

For the ROI selected in step 318, an overall evaluation of malignancy is displayed 326 on a display. The overall evaluation of malignancy based on a user-selected characterization feature in the user-selected ROI is displayed, typically but not necessarily, as a bar chart. Other forms of multi-color display are also possible as discussed above. Optionally, but usually, additional data relating to the individual parameters characterizing the characterization feature of the suspected lesion are displayed as numerical data or as multi-color bar charts or as both. Such a display has been discussed above with reference to FIGS. 2C and 2F.

In FIG. 4B, a second embodiment of the method of the present invention is shown, generally referenced 350. It is very similar to the embodiment shown in FIG. 4A. However, in this second embodiment, the processing step 316 is effected prior to the selecting step 318. Processing step 316 includes locating the characterization features, computing their associated parameters, and calculating an overall evaluation of malignancy for each feature based on their associated parameters. This processing is done for the entire digitized image. After processing, the characterization features, their associated parameters and the overall evaluations of malignancy for each characterization feature are stored 317 in a storage unit of the system. As in the embodiment of FIG. 4A, in selection step 318, the user selects an ROI. Then the characterization features and associated parameters for the suspected lesion in the selected ROI are retrieved 327 from storage and displayed 328.

It will be appreciated by persons skilled in the art that the present invention is not limited by what has been particularly shown and described herein above. Rather the scope of the invention is defined by the claims that follow.

What is claimed is:

1. A method for displaying a computer-generated determination of the likelihood of malignancy of a lesion in a mammogram, including the steps of:
   first, providing a digital image of the mammogram devoid of a computer selected region of interest;
   second, directly displaying the digital image;
   third, visually determining on the digital image a region of interest at a location not previously marked on the image, the region of interest being a portion of the breast displayed in the digital image encompassing a single lesion of interest to the user;
   fourth, selecting the region of interest on the displayed image by the user using an input device and selecting a characterization feature therein by the user;
   fifth, subsequent to said step of selecting the region of interest, employing a computer processor to quantify parameter-based classifier data of the user-selected characterization feature of the lesion in the user-selected region of interest, the classifier data comprised of a plurality of parameters; and
   sixth, displaying simultaneously the user-selected region of interest with the single lesion contained therein and quantified classifier data including a visual indication of an overall evaluation of the likelihood of malignancy of the lesion and at least one of the plurality of parameters of the user-selected characterization feature of the lesion in the selected region of interest, the displayed classifier data assisting a user in determining the likelihood of malignancy of the lesion.

2. A method according to claim 1, wherein the user-selected characterization feature is selected from a group of characterization features consisting of micro-classifications, spiculations, mass density and mass borders.

3. A method according to claim 1, wherein the displayed quantified classifier data is displayed on a part of the display separate from the digital image.

4. A method according to claim 1, wherein the overall evaluation of the likelihood of malignancy is displayed in a multicolor chart format.

5. A method according to claim 4, wherein the multicolor chart format is constructed to have a non-linear format with respect to the overall evaluation of the likelihood of malignancy.

6. A method according to claim 5 wherein the overall evaluation of the likelihood of malignancy on the multicolor chart format is indicated by an indicator.

7. A method according to claim 1, wherein the plurality of parameters is displayed in at least one of the following formats:
   numerical values; and
   multicolor charts.

8. A method according to claim 1, wherein the characterization feature of the lesion in the user-selected region of interest is displayed in the same color as an indicated overall evaluation of malignancy when the overall evaluation is displayed in a multicolor chart format.

9. A method according to claim 1, wherein at least one of the plurality of parameters in the classifier data is displayed in said displaying step as a numerical value, and wherein the numerical value is tracked in a series of mammograms of a same patient taken over a period of time, thereby assisting a user in evaluating the likelihood of malignancy of the lesion.

10. A method according to claim 1 wherein said steps of visually determining, selecting, employing, and displaying are repeated for other suspicious lesions, each lesion in a different region of interest, such repetition being effected one lesion a time.

11. A method for displaying a computer-generated determination of the likelihood of malignancy of a lesion in a mammogram, including the steps of:
   first, providing a digital image of the mammogram devoid of a computer selected region of interest;
   second, directly displaying the digital image;
   third, employing a computer processor to quantify all parameter-based classifier data of all characterization features of the lesion in the digital image and stored for later retrieval, each said classifier data comprised of a plurality of parameters;
   fourth, visually determining on the digital image a region of interest at a location not previously marked on the image, the region of interest being a portion of the breast displayed in the digital image and encompassing the single lesion of interest to the user;
   fifth, selecting the region of interest on the displayed image by a user using an input device and selecting a characterization feature therein by the user;
   sixth, subsequent to said step of selecting the region of interest, retrieving from storage the quantified classifier data related to the user-selected characterization feature of the lesion in the selected region of interest; and
   seventh, displaying simultaneously the user-selected region of interest with the lesion contained therein and quantified classifier data including a visual indication of an overall evaluation of the likelihood of malignancy of the lesion and at least one of the plurality of parameters of the characterization features of the lesion in the selected region of interest, the displayed classifier data assisting a user in determining the likelihood of malignancy of the lesion.

12. A method according to claim 11 wherein the user-selected characterization feature is selected from a group of characterization features consisting of micro-classifications, speculations, mass density and mass borders.

13. A method according to claim 11 wherein the displayed quantified classifier data is displayed on a part of the display separate from the digital image.

14. A method according to claim 11 wherein said retrieving step includes retrieving the stored classifier data from storage and returning it to the processor before the classifier data is transferred from the processor to the display for displaying.

15. A method according to claim 11, wherein said retrieving step includes retrieving the stored classifier data from storage and transferring the classifier data directly from storage to the display for displaying.

16. A method according to claim 11, wherein the overall evaluation of the likelihood of malignancy is displayed in a multicolor chart format.

17. A method according to claim 16, wherein the multicolor chart format is constructed to have a non-linear format with respect to the overall evaluation of the likelihood of malignancy.

18. A method according to claim 17 wherein the overall evaluation of the likelihood of malignancy on the multicolor format is indicated by an indicator.

19. A method according to claim 11 wherein the plurality of parameters is displayed in at least one of the following formats:
   numerical values; and
   multicolor charts.

20. A method according to claim 11, wherein the characterization feature of the lesion in the user-selected region of interest is displayed in the same color as an indicated overall evaluation of malignancy when the overall evaluation is displayed in a multicolor chart format.

21. A method according to claim 11, wherein at least one of the plurality of parameters in the classifier data is displayed in said displaying step as a numerical value, and wherein the numerical value is tracked in a series of mammograms of a same patient taken over a period of time, thereby assisting a user in evaluating the likelihood of malignancy of the lesion.

22. A method according to claim 11, wherein said steps of visually determining, selecting, retrieving and displaying are repeated for other suspicious lesions, each in a different region of interest, such repetition being effected one lesion a time.

23. A system for displaying a computer-generated determination of the likelihood of malignancy of a lesion in a mammogram, said system including:
   means for providing a digital image of the mammogram, the mammogram being devoid of a computer selected region of interest;
   a display for displaying the digital image of the mammogram;
   an user operated input device in communication with said display for selectably indicating a region of interest containing the lesion on the displayed digital image of the mammogram, the region of interest being a portion of the breast encompassing the single lesion of interest to the user, and which prior to being indicated, has not previously been marked on the image; and
   a processor for quantifying classifier data related to a user-selected characterization feature of the lesion in the digital image of the mammogram, said processor also being in communication with said display and the classifier data comprised of a plurality of parameters, wherein the digital image of the mammogram and the selected region of interest are displayed on said display and wherein said display simultaneously displays with the digital image and selected region of interest quantified classifier data including an overall evaluation of the likelihood of malignancy and at least one of the plurality of parameters related to the user-selected characterization feature of the lesion in the user-selected region of interest, the displayed classifier data providing a computer-generated overall evaluation of the likelihood of malignancy of the lesion.

24. A system according to claim 23, wherein the user-selected characterization feature is selected from a group of characterization features consisting of micro-classifications, speculations, mass density and mass borders.

25. A system according to claim 23, wherein the displayed quantified classifier data is displayed on a part of said display separate from the digital image.

26. A system according to claim 23 further comprising a storage unit in communication with both said display and said processor, wherein all the quantified classifier data of all characterization features in the digital image of the mammogram is first processed by said processor and then stored in said storage unit from which the classifier data relating to the characterization feature of the lesion in the selected region of interest is later retrieved and transferred directly to said display for displaying.

27. A system according to claim 26, wherein said storage unit is part of said processor.

28. A system according to claim 23 further comprising a storage unit in communication with said processor, wherein all the quantified classifier data of all characterization features in the digital image of the mammogram is first processed by said processor and then stored in said storage unit from which the classifier data relating to the characterization feature in the selected region of interest is later retrieved by said processor and transferred from said processor to said display for displaying.

29. A system according to claim 28, wherein said storage unit is part of said processor.

30. A system according to claim 23 wherein said means for providing a digital image of a mammogram includes a mammogram provider which provides a mammogram in analog format and further includes a digitizer for digitally representing the provided analogue mammogram.

31. A system according to claim 23 wherein said means for providing a digital image of a mammogram is a digital imaging system which directly provides a digital image of the mammogram.

* * * * *